(12) United States Patent
Blankenship et al.

(10) Patent No.: US 9,265,053 B2
(45) Date of Patent: Feb. 16, 2016

(54) SYSTEM AND METHOD FOR ASSIGNING BACKHAUL RESOURCES

(75) Inventors: Yufei Blankenship, Kildeer, IL (US); Brian Classon, Palatine, IL (US); Philippe Sartori, Algonquin, IL (US)

(73) Assignee: Futurewei Technologies, Inc., Plano, TX (US)

( * ) Notice: Subject to any disclaimer, the term of this patent is extended or adjusted under 35 U.S.C. 154(b) by 1100 days.

(21) Appl. No.: 12/725,280

(22) Filed: Mar. 16, 2010

(65) Prior Publication Data

US 2010/0254301 A1  Oct. 7, 2010

Related U.S. Application Data

(60) Provisional application No. 61/166,976, filed on Apr. 6, 2009.

(51) Int. Cl.
*H04W 72/08* (2009.01)
*H04W 84/04* (2009.01)

(52) U.S. Cl.
CPC .......... *H04W 72/085* (2013.01); *H04W 84/045* (2013.01)

(58) Field of Classification Search
USPC .................................. 370/315, 395.4–395.43
See application file for complete search history.

(56) References Cited

U.S. PATENT DOCUMENTS

| | | | |
|---|---|---|---|
| 6,233,228 B1 * | 5/2001 | Collar et al. ................... | 370/315 |
| 2007/0160019 A1 | 7/2007 | Classon et al. | |
| 2009/0245153 A1 * | 10/2009 | Li et al. ........................... | 370/312 |
| 2010/0103858 A1 * | 4/2010 | Palanki et al. ................. | 370/315 |

OTHER PUBLICATIONS

Ericsson, "Efficient Support of Relays Through MBSFN Subframes," Discussion, TSG-RAN WG1 # 55, R1-084357, Nov. 10-14, 2008, 3 pages, Prague, Czech Republic.
LG Electronics, "Condsideration on Resource Allocation for Relay Backhaul Link," Discussion, 3GPP TSG RAN WG1 Meeting # 55bis, R1-090222, Jan. 12-16, 2009, 5 pages, Ljubljana, Slovenia.
Samsung, "L1 Relay Design and Operations," Discussion and Decision, 3GPP TSG RAN WG1 # 55bis, R1-090108, Jan. 12-16, 2009, pp. 1-3, Ljubljana, Slovenia.
Cewit, et al.,"WF on Relaying Operation for LTE-A," Document for Decision, 3GPP TSG-RAN WG1 # 56, R1-091098, Feb. 9-13, 2009, 2 pages, Athens, Greece.
Vodafone, et al.,"Type II Relay Frame-Work Definition," R1-091632, 3 pages.
3rd Generation Partnership Project, "Technical Specification Group Radio Access Network; Evolved Universal Terrestrial Radio Access (E-UTRA) Radio Resource Control (RRC); Protocol Specification (Release 8)," 3GPP TS 36.331 v8.4.0, Dec. 2008, 198 pages.
3rd Generation Partnership Project, Technical Specification Group Radio Access Network; Further Advancements for E-UTRA Physical Layer Aspects (Release 9), 3GPP TR 36.814 v0.4.1, Feb. 2009, 31 pages.
3rd Generation Partnership Project, "Technical Specification Group Radio Access Network; Evolved Universal Terrestrial Radio Access (E-UTRA); Physical Layer for Relaying Operation (Release 10)," 3GPP TS 36.216 v10.3.1, Sep. 2011, 16 pages.

* cited by examiner

*Primary Examiner* — Hassan Kizou
*Assistant Examiner* — Ashil Farahmand
(74) *Attorney, Agent, or Firm* — Slater & Matsil, LLP

(57) ABSTRACT

A system and method for assigning backhaul resources is provided. A method for wireless relay network communications includes determining performance information regarding a plurality of relay nodes, allocating resource blocks in a subframe to relay nodes based on the information, and notifying relay nodes of the allocated RBs using a signaling message.

24 Claims, 5 Drawing Sheets

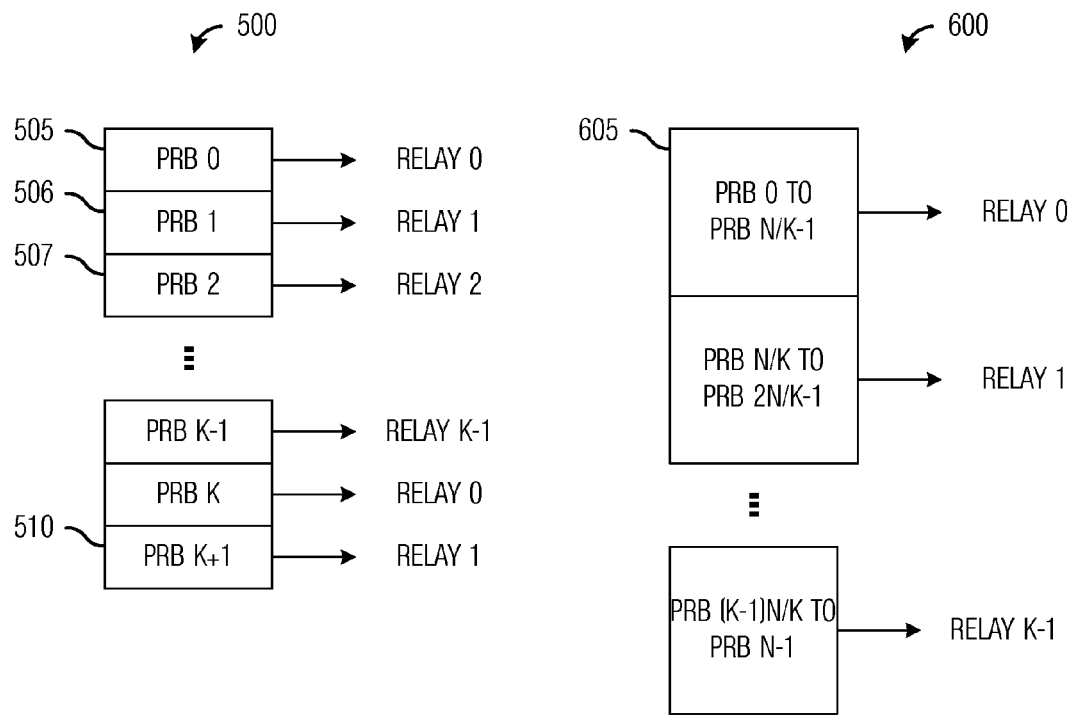
Fig. 5
Fig. 6
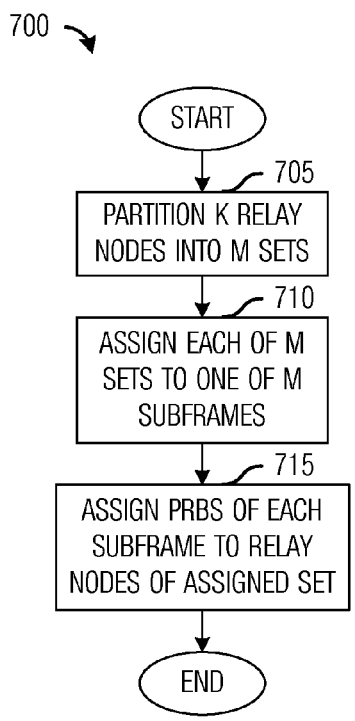
Fig. 7

SYSTEM AND METHOD FOR ASSIGNING BACKHAUL RESOURCES

This application claims the benefit of U.S. Provisional Application No. 61/166,976, filed on Apr. 6, 2009, entitled "Method and Apparatus for Assigning Backhaul Resources to LTE-A Relays," which application is hereby incorporated herein by reference.

TECHNICAL FIELD

The present invention relates generally to wireless communications, and more particularly to a system and method for assigning backhaul resources.

BACKGROUND

During the standardization process of the Third Generation Partnership Project (3GPP) release 10, also known as, Long Term Evolution Advanced (LTE-A), relay nodes (RN) were given consideration. In the 3GPP TR 36.814 V0.4.1, "$3^{rd}$ Generation Partnership Project; Technical Specification Group Radio Access Network; Further Advancements for E-UTRA Physical Layer Aspects (Release 9)," February 2009, it is stated that "relaying is considered for LTE-Advanced as a tool to improve, e.g., the coverage of high data rates, group mobility, temporary network deployment, the cell-edge throughput and/or to provide coverage in new areas." A wide variety of relay nodes may currently be under discussion, including smart repeaters, different types of layer 2 (L2) relay nodes such as decode-and-forward, and layer 3 (L3) relay nodes.

Common to all the relay node types is that a relay node is wirelessly connected to a radio-access network (RAN) through a donor cell (or a donor enhanced NodeB (eNB)). A wireless connection between the relay node and the donor cell is crucial especially for relay nodes operating in higher layers since the capacity of the wireless connection may be a bottleneck to the uplink (UL) and downlink (DL) capacity of all user equipments (UEs), or mobile stations, terminals, users, and so forth, served by the relay node.

As used in this discussion, the term layers refer to the lower layers in the Open System Interconnection (OSI) Reference Model, such as physical layer (i.e., layer 1), data link layer (i.e., layer 2), network layer (i.e., layer 3), and so on.

At the RAN1 #56 meeting, it was agreed that at least "type I" relay nodes are to be a part of LTE-A, where "type I RN shall have its own Physical Cell ID (defined in LTE Release 8) and transmit its own synchronization channels, reference symbols." See R1-091098, "WF on Relaying Operation for LTE-A," February 2009. At the RAN1 #56bis meeting, it was proposed that a "type II" relay node may be defined for LTE-A. A key characteristic of the type II RN is that "type II RN should not have a separate cell ID and thus would not create any new cell(s)," (R1-091632). Common to the different types of relay nodes is the wireless backhaul link between the relay nodes and the donor cell/donor eNB.

For inband relaying, the eNB-to-relay node link operates in the same frequency spectrum as the relay node-to-UE link. In order to avoid interference between transmissions occurring on the eNB-to-relay node link and the relay node-to-UE link, time-division multiplexing (TDM) has been proposed to multiplex the two links. That is, the relay node does not transmit to UEs when it is supposed to receive transmissions from the donor eNB, and vice versa. Transmissions between the donor eNB and the relay node may occur during backhaul subframes, which are configured as multi-media broadcast over a single frequency network (MBSFN) subframes between the relay node and its UEs.

It is expected that multiple relay nodes may be planted in a coverage area of the same donor eNB to cover its cell edge. In this scenario, multiple relay nodes are wirelessly connected to the same donor eNB. It is not clear how the available resources should be shared between the multiple nodes.

SUMMARY OF THE INVENTION

These and other problems are generally solved or circumvented, and technical advantages are generally achieved, by embodiments of a system and method for assigning backhaul resources.

In accordance with an embodiment, a method for wireless relay network communications is provided. The method includes determining performance information regarding a plurality of relay nodes, allocating resource blocks (RBs) in a subframe to relay nodes based on the performance information, and notifying relay nodes of the allocated RBs using a signaling message.

In accordance with another embodiment, a method for controller operations is provided. The method includes determining performance information for a plurality of relay nodes in a service area of a controller, allocating resource blocks (RBs) to the plurality of relay nodes, transmitting a signaling message to each relay node in the plurality of relay nodes, and scheduling a transmission for a relay node at the RBs allocated to the relay node. The allocating being based on the performance information, and the signaling message includes an indicator of RBs allocated to the relay node.

In accordance with another embodiment, a communications controller is provided. The communications controller includes a processor, a transmit and receive circuit coupled to the processor and to an antenna, a scheduler coupled to the processor, and a memory coupled to the processor. The processor executes programs and applications, the transmit and receive circuit processes received transmission and prepares transmissions for transmission, the scheduler schedules resource blocks (RBs) to a plurality of relay nodes operating in a coverage area of the communications controller, and the memory stores applications, programs, and assignments of the RBs. The scheduler makes use of performance information of the relay nodes in the plurality of relay nodes to schedule the RBs.

An advantage of an embodiment is that network resources may be allocated to a relay node on a backhaul link, whereas an implicit assumption up to now was that TDM would be used.

A further advantage of an embodiment is that the network resources may be allocated to relay nodes using a variety of considerations to meet performance requirements, fairness requirements, and so forth.

The foregoing has outlined rather broadly the features and technical advantages of the present invention in order that the detailed description of the embodiments that follow may be better understood. Additional features and advantages of the embodiments will be described hereinafter which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the embodiments, and the advantages thereof, reference is now made to the following descriptions taken in conjunction with the accompanying drawings, in which:

FIG. 5 is a diagram of a plurality of PRBs allocated to relay nodes using a distributed FDM PRB allocation technique;

FIG. 6 is a diagram of a plurality of PRBs allocated to relay nodes using a block FDM PRB allocation technique;

FIG. 7 is a flow diagram of eNB operations in the allocation of PRBs to relay nodes using a hybrid TDM-FDM allocation technique;

DETAILED DESCRIPTION OF ILLUSTRATIVE EMBODIMENTS

The making and using of the embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The embodiments will be described in a specific context, namely a LTE-A compliant wireless communications system. The invention may also be applied, however, to other wireless communications systems that support the use of relay nodes such as IEEE802.16m.

Figure 1:
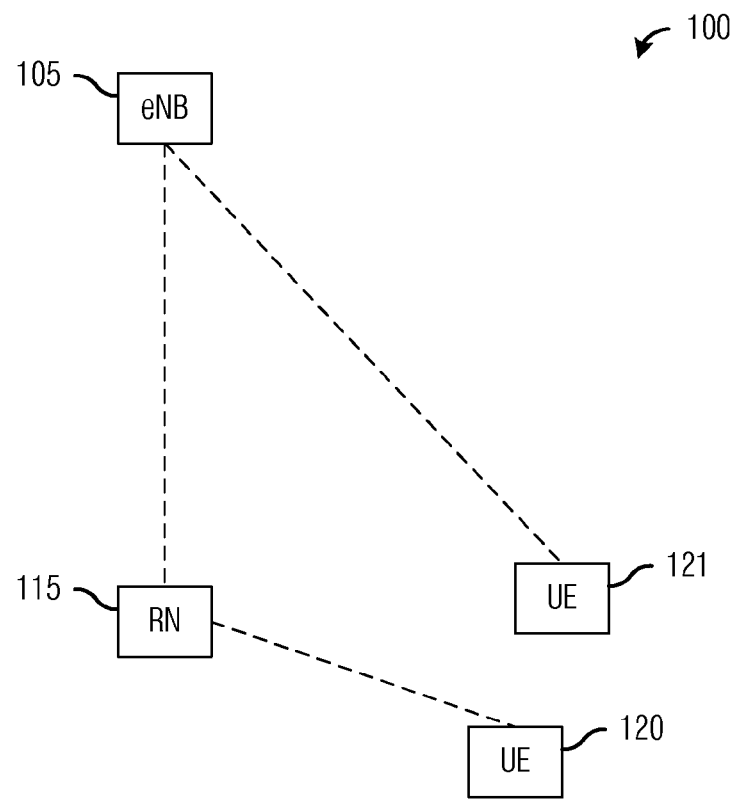
FIG. 1 is a diagram of a communications system.

FIG. 1 illustrates a communications system 100. Communications subsystem 100 includes an eNB 105. Communications subsystem 100 also includes a RN 115. As discussed earlier, a RN may be used to improve data transfer rates, mobility, coverage, throughput, and so forth. A RN is connected through a wireless connection ("wireless relay backhaul") to an eNB, wherein the eNB that is being used to wirelessly connect the RN is referred to as a donor eNB. For example, RN 115 is connected to eNB 105 through a wireless relay backhaul and eNB 105 is the donor eNB of RN 115. Communications subsystem 100 also includes one or more UEs, such as UE 120 and UE 121. As example, UE 120 represents a UE that is served directly by a RN (RN 115) while UE 121 represents a UE that is served directly by the donor eNB (eNB 105). An eNB can simultaneously serve RN(s) and its own UEs, and a RN can serve several UEs.

To the eNB, the RNs are similar to its other UEs in many aspects. To the UE served by RN, an eNB or RN may be functionally equivalent, with the RN appearing the same as an eNB to its UE (e.g., UE 120). When the UE has information to transmit, the UE must request wireless resource and can transmit after receiving an UL scheduling grant of the wireless resource from eNB. Similarly, when there is information for the UE, the eNB sends similar downlink scheduling assignment of the wireless resource to indicate to the UE that the information is being sent and where and how to detect the information.

Figure 2A:
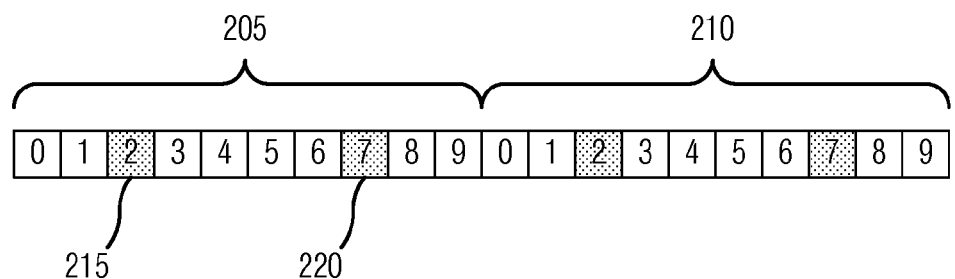
FIG. 2a is a diagram of several radio frames of a 3GPP LTE compliant wireless communications system.

FIG. 2a illustrates several radio frames of a 3GPP LTE compliant wireless communications system. An LTE compliant radio frame, such as radio frame 201 or radio frame 202, consists of 10 subframes numbered from 0 to 9. Each subframe has a duration of one ms. Out of the 10 subframes in a radio frame, subframes 0 and 5 are used to transmit synchronization frames and, therefore, may not be used for MBSFN. Furthermore, for frequency division duplex (FDD) subframe 9 and subframe 4 (in some configurations) are used for paging, while for time division duplex (TDD), subframes 1 and 6 are used for paging.

Thus, a set of mandatory unicast subframes are subframes {0, 4, 5, and 9} for FDD and subframes {0, 1, 5, and 6} for TDD, and may not be used for inband backhaul link. Other than the subframes in the set of mandatory unicast subframes, the subframes in a radio frame may be configured as MBSFN subframes. An exception exists for TDD where subframe #2 is always designated for uplink, thus not available for MBSFN designation. As shown in FIG. 2a, subframe #2 203 and subframe #7 204 have been allocated for backhauling in a FDD system.

Figure 2B:
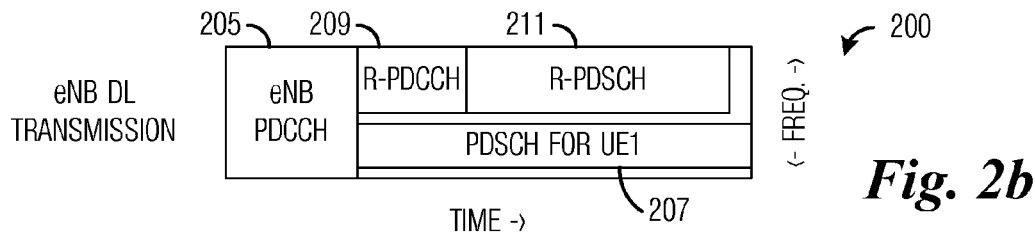
FIG. 2b is a diagram of a frame structure for a downlink (DL) link transmission from an eNB to a RN.

FIG. 2b illustrates a frame structure for a downlink (DL) link 200 transmission from an eNB to a RN. DL link 200 includes a control region 205 and a data region 207. Although control region 205 is labeled as the eNB physical downlink control channel (PDCCH), control region 205 may contain other types of control channels. Similarly, for simplicity data region 207 is labeled with physical downlink shared channel (PDSCH). Since DL link 200 is also a DL relay backhaul link, DL link 200 includes some resource elements (REs) dedicated for use as the DL relay backhaul link, such as relay-physical downlink control channel (R-PDCCH) 209 and relay-physical downlink shared channel (R-PDSCH) 211.

Figure 2C:
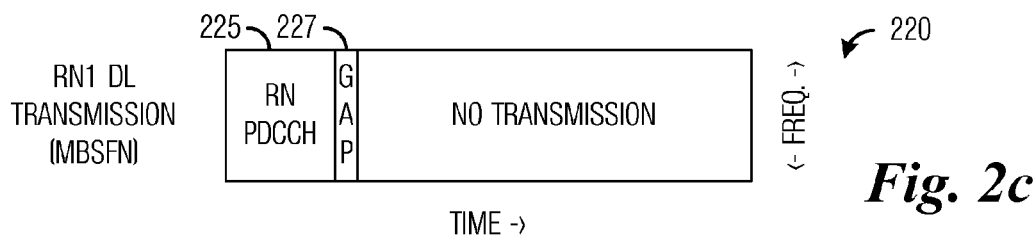
FIG. 2c is a diagram of an MBSFN subframe structure for a DL link transmission from a RN to a UE which is time-aligned with the DL link.

FIG. 2c illustrates an MBSFN subframe structure for a DL link 220 transmission from a RN to a UE which is time-aligned with DL link 200. DL link 220 includes a PDCCH 225 sent by RN, a gap 227, and a period of no transmission. Gap 227 may be inserted to allow radio frequency (RF) circuitry time to switch from transmission status to reception status, for example.

Figure 2D:
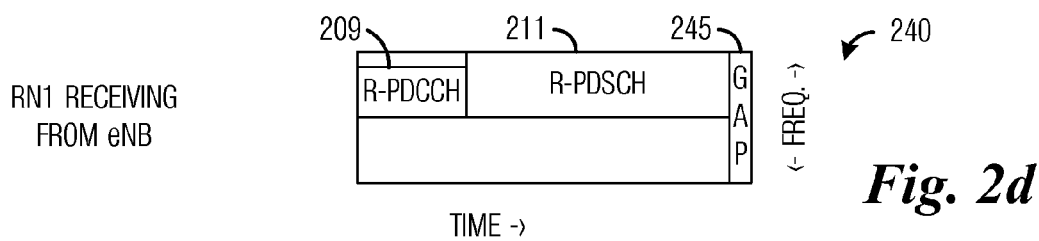
FIG. 2d is a diagram of a frame structure of a DL link transmission from an eNB to a RN as seen by the RN which is time-aligned with the DL links.

FIG. 2d illustrates a frame structure of a DL link 240 transmission from an eNB to a RN as seen by the RN which is time-aligned with DL links 200 and 220. At the RN, DL link 200 transmitted by the eNB may be detected by the RN as simply R-PDCCH 209 and R-PDSCH 211. A gap 245 is also needed by the RN to finish the switch from reception status to transmission status before the next normal subframe start in the access link.

Figure 2E:
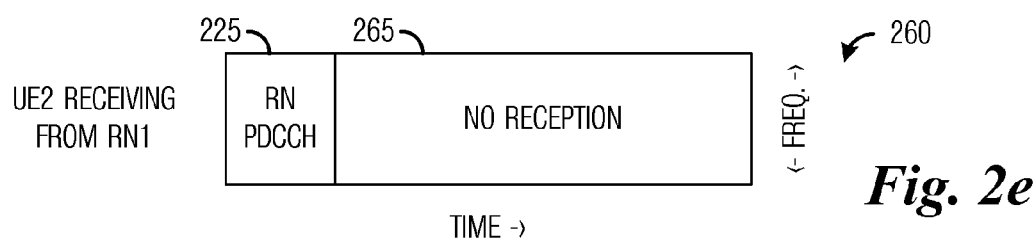
FIG. 2e is a diagram of a frame structure of a DL link transmission (MBSFN subframe) from a RN to a UE as seen by the UE which is time-aligned with the DL links.

FIG. 2e illustrates a frame structure of a DL link 260 transmission (MBSFN subframe) from a RN to a UE as seen by the UE which is time-aligned with DL links 200, 220, and 240. At the UE, DL 220 transmitted by the RN may be detected as RN control channel 225. A remainder of DL link 260 may be a no reception period 265 according to MBSFN subframe definition.

Figure 3:
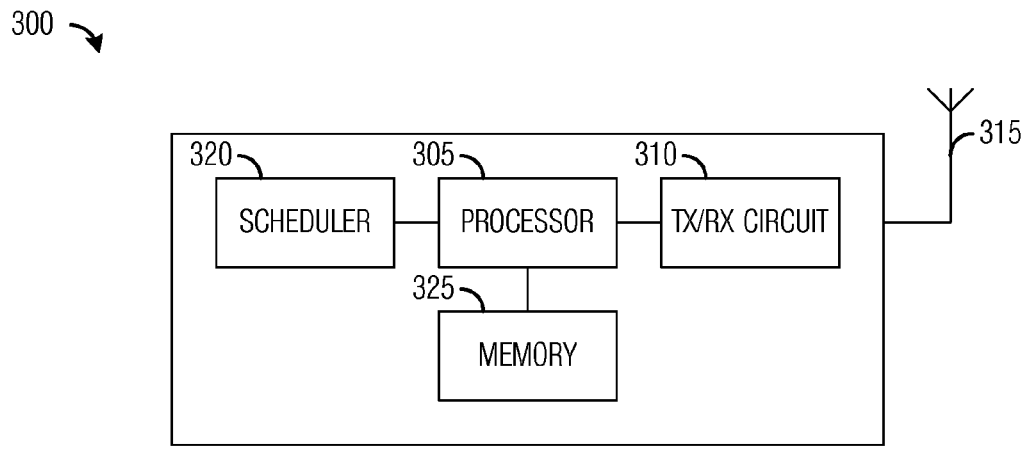
FIG. 3 is a diagram of a detailed view of an eNB.

FIG. 3 illustrates a detailed view of an eNB 300. eNB 300 may control communications to and from UEs that it is serving. Additionally, eNB 300 may be a donor eNB, assigning a portion of its available resource elements to one or more relay nodes operating within its coverage area. eNB 300 may allocate and schedule resource elements dedicated to relay nodes, such as resources for R-PDCCH and R-PDSCH, to the one or more relay nodes so that performance constraints, such as throughput, latency, and so forth, are met.

eNB 300 includes a processor 305 that may be used to run applications and programs. eNB 300 also includes a transmit/receive circuit 310 that may be used to process information/data to be transmitted as well as process received information/data. For example, transmit/receive circuit 310 may filter, amplify, error detect, error correct, encode, decode, and so forth, the information/data. The information/data may be received or transmitted by way of an antenna 315. Although shown as a single antenna, antenna 315 may be an antenna array of multiple antennas.

eNB 300 further includes a scheduler 320 that may be used to schedule transmissions of information/data to UEs served by eNB 300. In addition to scheduling transmissions of information/data to UEs that eNB 300 is serving, scheduler 320 may also be used to schedule transmission opportunities for UEs served by eNB 300. Furthermore, scheduler 320 may be used to allocate resource elements that it has donated for use by relay nodes operating within its coverage area.

In general, eNB 300 may allocate a number of subframes in its radio frames for use as backhaul for relay nodes operating within its coverage area. However, the backhaul subframes may need to be allocated to the relay nodes to ensure that performance constraints, such as throughput, latency, fairness, and so on, are met. Detailed descriptions of several techniques that may be used by scheduler 320 to allocate resource elements of backhaul subframes to relay nodes are provided below.

Both scheduler 320 and processor 305 may be coupled together and to a memory 325. Memory 325 may be used to store applications and programs, as well as scheduling data, such as received channel information from the UEs served by eNB 300. Memory 325 may also be used to store information about which network resources have been assigned to which UEs as well as relay nodes, codebooks, and so on.

Figure 4:
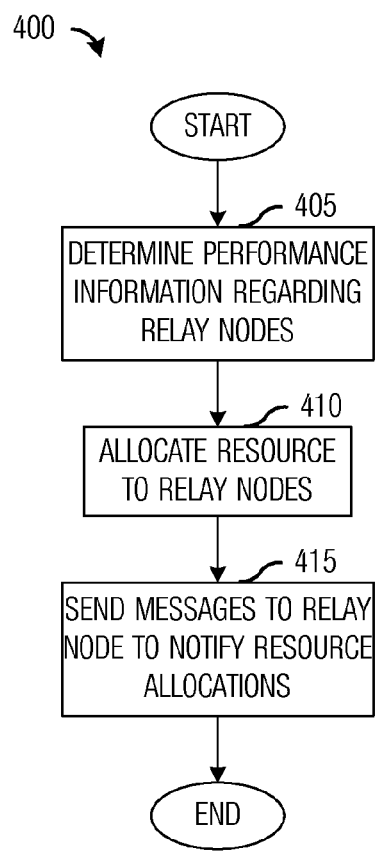
FIG. 4 is a flow diagram of eNB operations in allocating resource elements to relay nodes.

FIG. 4 illustrates a flow diagram of eNB operations 400 in allocating resource elements to relay nodes. eNB operations 400 may be indicative of operations taking place in a donor eNB, such as eNB 105, as the donor eNB allocates resource elements of backhaul subframes to relay nodes. The donor eNB may allocate resource elements to allow relay nodes to receive from the donor eNB as well as to transmit to the donor eNB. eNB operations 400 may occur while the donor eNB is in a normal operations mode and while relay nodes being served by the donor eNB continue operating.

eNB operations 400 may begin with the donor eNB determining performance information regarding the relay nodes (block 405). The performance information regarding the relay nodes may be used by the donor eNB to determine an allocation of the resource elements. The performance information may include information such as bandwidth requirement, priority, number of UEs served, quality of service requirements, allocation history, frequency diversity performance, and so forth, for a relay node. The performance information may be used by the donor eNB to determine an allocation of the resource elements to the various relay nodes. In the following, resource allocation is frequently discussed in units of resource blocks (RBs), which is composed of useful resource elements contained in 12 subcarriers in a 3GPP LTE compliant communications system.

For example, if a relay node has greater bandwidth requirements than the other relay nodes, then the relay node may be allocated a larger number of resource elements. However, if a relay node is serving only a small number of UEs, then the relay node may not be allocated as many resource elements as a similar relay node that is serving a larger number of UEs. Additionally, if historical information shows that a relay node has not been allocated many resource elements in the past, then the donor eNB may allocate the relay node more resource elements. Also, a relay node serving UEs with tight quality of service restrictions may be allocated resource elements in such a way that the quality of service restrictions are met.

The donor eNB may then allocate the resource elements to the relay nodes (block 410). The donor eNB may utilize a variety of techniques to allocate the resource elements so that fairness, performance, quality of service restrictions, maximize frequency diversity, and so on, are met. Descriptions of a number of different resource element allocation techniques are provided below.

With the resource elements allocated, the donor eNB may transmit messages, such as signaling messages, to the relay nodes informing them of their allocation of resource elements (if any), time/frequency information locating the resource elements, and so forth (block 415). eNB operations 400 may then terminate.

For the discussion of the allocation of resource elements to relay nodes, assume that there are k relay nodes operating within a coverage area of an eNB. Also assume that a backhaul connection for the k relay nodes is scheduled at regular intervals, and that a number of MBSFN subframes per radio frame have been configured between relay nodes and its UEs so that the corresponding subframe between eNB and relay nodes can be used for backhauling. Furthermore, assume that a total bandwidth B is available and may be fractioned into N physical resource blocks (PRB).

One technique that may be used in allocating backhaul subframes to relay nodes may be to allocate the subframes in a round robin manner. However, this technique may not be optimal because of latency constraints. For example, if nine relay nodes are deployed within a coverage area of an eNB, the relay nodes would be assigned a backhaul subframe only once every 45 ms (assuming the subframe structure shown in FIG. 2a is used). The significant service interval may cause problems for delay-constrained types of data, such as voice over IP (VoIP), video streaming, or so forth. Therefore, round robin scheduling may be suitable in situations such as when a small number of relay nodes are deployed or for delay tolerant applications, but may not be suitable for all deployment scenarios.

According to an embodiment, the backhaul subframes may be shared in frequency domain in a frequency division multiplexing (FDM) manner. With FDM, each relay node j may be assigned to a subset of resource blocks (RB) in each subframe. The RB assignment may be physical RB (PRB) or virtual RB (VRB). Within the RBs assigned to a relay node, the eNB and relay nodes may utilize various techniques to increase data throughput for the backhaul link, e.g., various multiple input, multiple output (MIMO) antenna techniques.

FIG. 5 illustrates a plurality of PRBs 500 allocated to relay nodes using a distributed FDM PRB allocation technique.

Plurality of PRBs 500 may include N PRBs numbered consecutively from zero (PRB 505) to k+1 (PRB 510) and so on to N−1. Plurality of PRBs 500 may be allocated one PRB at a time to each of k relay nodes.

PRBs may be assigned to the k relay nodes, e.g., PRB set $$\left\{ j, k+j, 2k+j, \ldots \left\lfloor \frac{N}{k} \right\rfloor k + j \right\}$$

can be assigned to relay node j in the coverage area of the donor eNB. For example, PRB 505 may be assigned to relay node 0, PRB 506 may be assigned to relay node 1, PRB 507 may be assigned to relay node 2, and PRB 510 may be assigned to relay node 1. Recall that the N available PRBs in plurality of PRBs 500 are numbered from 0, 1, ..., N−1. The allocation may be good to exploit any frequency diversity in case the communications channel between the donor eNB and the relay nodes are frequency selective.

With distributed FDM PRB allocation, depending on the value of $$\left\lfloor \frac{N}{k} \right\rfloor, \text{ up to } k-1$$

PRBs may not be allocated. Several enhancements may be possible. For example, the assignment may continue in a round-robin manner and the last relay nodes may be allocated less PRBs. Or, if a particular relay node needs more resources, these allocated PRBs may be allocated to the particular relay node.

Distributed FDM PRB allocation may be extended to a case where traffic demand per relay node is different. For example, if one relay node requires twice as many PRBs as other relay nodes, it may be considered as two virtual relay nodes, with the PRBs allocated to the two virtual relay nodes being allocated to the single relay node. The allocation of the PRBs to the virtual relay nodes may be made using PRBs that are next to each other, as far as possible from each other to maximize frequency diversity, and so forth. Distributed FDM PRB allocation may also be performed in both time and frequency.

Distributed FDM PRB allocation may be attractive when frequency diversity is required or desired. Distributed FDM PRB may also be used to allocate VRBs. However, with the allocation of VRBs, additional frequency diversity may not be needed. Distributed FDM PRB allocation may require the use of messaging to inform a relay node its order in the allocation process.

FIG. 6 illustrates a plurality of PRBs 600 allocated to relay nodes using a block FDM PRB allocation technique. Unlike distributed FDM PRB allocation, block FDM PRB allocation allocates multiple PRBs to a single relay node in a contiguous block of PRBs instead of having the PRBs spread out in frequency. Each relay node j may be allocated PRBs from $$j \left\lfloor \frac{N}{k} \right\rfloor \text{ to } (j+1) \left\lfloor \frac{N}{k} \right\rfloor - 1.$$

As an example, a block of PRBs 605 with PRBs starting at PRB 0 to PRB $$\left\lfloor \frac{N}{k} \right\rfloor - 1$$

may be allocated to relay node zero. Since a communications channel between a donor eNB and a relay node is expected to be relatively clean, e.g., line of sight, block FDM PRB allocation may be a simple PRB allocation technique without incurring performance loss.

Block FDM PRB allocation may be extended to a case where traffic demand per relay node is different. For example, if one relay node requires twice as many PRBs as other relay nodes, it may be considered as two virtual relay nodes, with the PRBs allocated to the two virtual relay nodes being allocated to the single relay node. The allocation of the PRBs to the virtual relay nodes may be made using PRBs that are next to each other, as far as possible from each other to maximize frequency diversity, and so forth. Block FDM PRB allocation may also be performed in both time and frequency.

Block FDM PRB allocation may be attractive when frequency diversity is required or desired. Block FDM PRB may also be used to allocate VRBs. However, with the allocation of VRBs, additional frequency diversity may not be needed. Block FDM PRB allocation may require the use of messaging to inform a relay node its order in the allocation process.

FIG. 7 illustrates a flow diagram of eNB operations 700 in the allocation of PRBs to relay nodes using a hybrid TDM-FDM allocation technique. eNB operations 700 may be indicative of operations occurring in a donor eNB as the donor eNB allocates resource elements to relay nodes operating within its coverage area. eNB operations 700 may occur while the donor eNB is in a normal operating mode and while relay nodes are operating.

For discussion purposes, let there be M subframes within a single radio frame available for use in relay node backhaul operation and k relay nodes operating within the coverage area of the donor eNB. eNB operations 700 may begin with the donor eNB partitioning the k relay nodes into M sets of relay nodes, where M is a positive integer value (block 705). According to an embodiment, each set may have a different number of relay nodes. The number of relay nodes assigned to a single set may be dependent on factors such as bandwidth requirements of the relay nodes, priorities, quality of service restrictions, and so on. For example, a relay node with very high bandwidth requirements may be assigned to a set all by itself, while a number of relay nodes with small bandwidth requirements may all be assigned to a single set.

Each of the M sets of relay nodes may then be assigned to one of the M subframes (block 710). Then, the PRBs in each of the M subframes may be allocated using a FDM PRB allocation technique, such as those discussed previously (block 715). eNB operations 700 may then terminate.

Hybrid TDM-FDM allocation may require a signaling message be transmitted to the relay nodes to notify the relay nodes of their assignment to a given set of relay nodes and then to provide information about the order of the relay node within the set. As an example, the signaling message may have the following format:

```
Backhaul relay_assignment{
    3 bits      set;
    3 bits      order within set;
    1 bit       allocation type (e.g., round robin or block)}.
```

Although the discussion of eNB operations 700 focuses on the allocation of subframes for a single radio frame, the embodiments are operable for the allocation of subframes for multiple radio frames. Therefore, the discussion of the allocation of subframes from a single radio frame should not be construed as being limiting to either the spirit or the scope of the embodiments.

Figure 8:
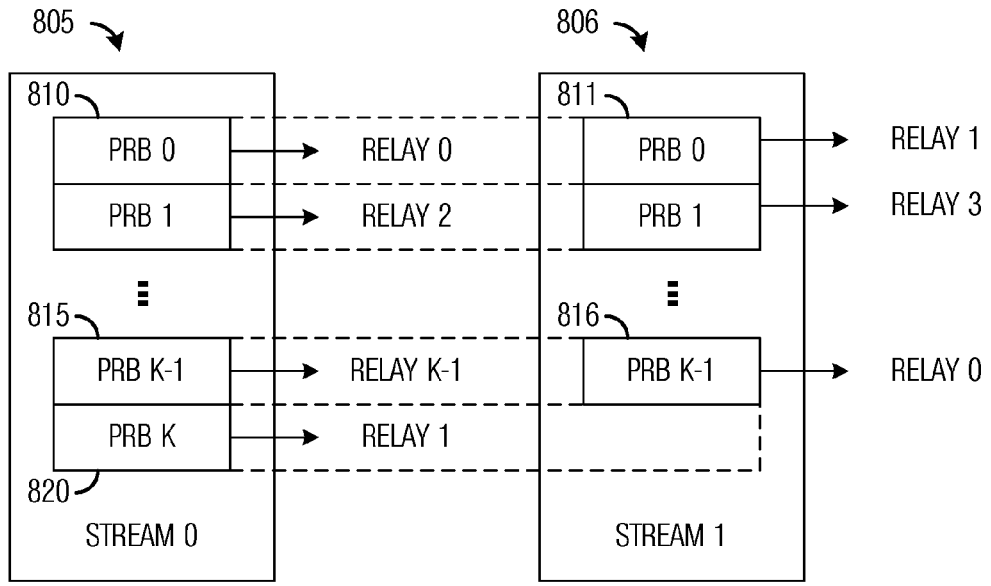
FIG. 8 is a diagram of an allocation of two parallel PRB streams using spatial division multiple access.

FIG. 8 illustrates an allocation of two parallel PRB streams 800 using spatial division multiple access (SDMA). While the FDM PRB allocation techniques discussed above distribute the resource elements of available bandwidth among the relay nodes, spatial division multiplexing (SDM) may be deployed for the transmission from the donor eNB to relay nodes where spatial resources are shared among the relay nodes while each relay node may utilize a larger portion of the bandwidth. When the number of relay nodes is small, e.g., two, it may be possible that each relay node utilizes an entirety of the available bandwidth. SDM may be particularly attractive for use in backhauling since the relay nodes are generally static (immobile), therefore, the donor eNB-to-relay node channel changes very slowly and precoding matrices may be updated relatively infrequently.

In general, if there are S active streams with N RBs each, the number of total available resource blocks is S*N RBs. A resource allocation procedure using both FDM and SDM may be applied to the S*N resource blocks.

FIG. 8 displays two parallel PRB streams 805 and 806, with stream 805 having k PRBs and stream 806 with k−1 PRBs. As shown in FIG. 8, PRB 0 810 of stream 805 may be allocated to relay node 0, while PRB 0 811 of stream 806 may be allocated to relay node 1. Similarly, PRB k−1 815 of stream 805 may be allocated to relay node k−1 and PRB k−1 816 of stream 806 may be allocated to relay node 0. Since stream 806 does not have PRB k, only PRB k 820 of stream 805 is allocated to relay node 1. For simplicity purposes, FIG. 8 depicts a scenario where two streams exist over the entire available bandwidth for relays. In general, the number of available streams may vary over the available bandwidth, for example, a subset of the available PRBs have two streams, while another subset of PRBs may have one stream only.

Figure 9:
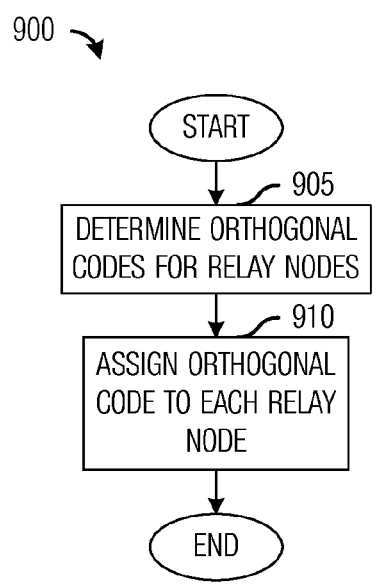
FIG. 9 is a flow diagram of eNB operations in the allocation of PRBs to relay nodes using code division multiplexing.

FIG. 9 illustrates a flow diagram of eNB operations 900 in the allocation of PRBs to relay nodes using code division multiplexing (CDM). eNB operations 900 may be indicative of operations occurring in a donor eNB as the donor eNB allocates resource elements to relay nodes operating within its coverage area. eNB operations 900 may occur while the donor eNB is in a normal operating mode and while relay nodes are operating.

eNB operations 900 may begin with the donor eNB determining a set of codes to be used for the relay nodes (block 905). According to an embodiment, orthogonal codes, such as Walsh codes, where the length of the code may be dependent on the number of relay nodes operating within the coverage area of the donor eNB, are used. Each relay node may be assigned a code (block 910). Once the assignment is made, a message may be sent to each relay node to inform the relay node of the code that it is to use. Each relay node may utilize an entirety of the available bandwidth for backhaul operation. eNB operations 900 may then terminate.

Although the embodiments and their advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for wireless relay network communications, the method comprising:
   determining performance information regarding a plurality of relay nodes;
   grouping the relay nodes in the plurality of relay nodes into M sets, where M is a positive integer value;
   allocating backhaul resource blocks (RBs) in at least one subframe using a frequency division multiplexing technique and a time division multiplexing technique to the relay nodes in accordance with the performance information; and
   notifying the relay nodes of the allocated RBs using a signaling message, the signaling message comprising, for each relay node of the relay nodes, information identifying a set of the M sets to which the relay node is assigned, and an order of the relay node within the set.

2. The method of claim 1, wherein M corresponds to a number of subframes with RBs available for allocation.

3. The method of claim 2, wherein the relay nodes within a single set are allocated RBs in a same subframe.

4. The method of claim 3, wherein the relay nodes within a first set are allocated to RBs of a subframe different from a subframe allocated to a second set.

5. The method of claim 1, wherein the RBs are used for data transmission from a controller to the plurality of relay nodes.

6. The method of claim 1, wherein the RBs are used for data transmission from the relay nodes to a controller.

7. The method of claim 1, wherein for each relay node, the performance information comprises a bandwidth requirement, priority information, a number of communications devices served, quality of service requirements, resource element allocation history, or a combination thereof.

8. The method of claim 1, wherein allocating RBs using a frequency division multiplexing technique allocates a sequence of RBs in a subframe to the plurality of relay nodes.

9. The method of claim 8, wherein using a frequency division multiplexing technique comprises assigning RBs to a relay node, wherein the RBs are not contiguous in frequency.

10. The method of claim 8, wherein using a frequency division multiplexing technique comprises assigning RBs to a relay node, wherein the RBs are contiguous in frequency.

11. The method of claim 8, wherein a first relay node is assigned a different number of RBs than a second relay node.

12. The method of claim 1, wherein allocating RBs further comprises using a spatial division multiplexing technique to allocate a plurality of RBs to the plurality of relay nodes.

13. The method of claim 12, wherein using a spatial division multiplexing technique comprises assigning two different spatial streams of RBs to two different relay nodes.

14. The method of claim 1, wherein allocating resource blocks further comprises using a code division multiplexing technique to allocate a plurality of resource blocks to the plurality of relay nodes.

15. The method of claim 14, wherein using a code division multiplexing technique comprises:
    assigning a code for each relay node in the plurality of relay nodes; and
    assigning a same RB to at least two relay nodes wherein each of the at least two relay nodes has been assigned a different code.

16. A method for controller operations, the method comprising:
    determining performance information for a plurality of relay nodes in a service area of a controller;
    allocating backhaul resource blocks (RBs) using a spatial division multiplexing technique or a code division multiplexing technique to the plurality of relay nodes, wherein the allocating is in accordance with the performance information;
    grouping the relay nodes in the plurality of relay nodes into M sets of relay nodes, where M is a positive integer value;
    transmitting a signaling message to each relay node in the plurality of relay nodes, wherein the signaling message comprises an indicator of RBs allocated to the relay node, an indicator of an assignment of the relay node to a set from the M sets, and an indicator of an order of the relay node within the set; and
    scheduling a transmission for a relay node at the RBs allocated to the relay node.

17. The method of claim 16, wherein a RB comprises a physical resource block or a virtual resource block.

18. The method of claim 16, wherein M corresponds to a number of subframes with RBs available for allocation.

19. The method of claim 18, wherein the relay nodes within a single set are assigned RBs in a same subframe, and wherein the relay nodes of two different sets are assigned RBs in two different subframes.

20. The method of claim 16, wherein allocating RBs comprises using two or more of a frequency division multiplexing technique, the spatial division multiplexing technique, and the code division multiplexing technique to allocate the RBs to the plurality of relay nodes.

21. The method of claim 16, wherein the scheduled transmission is from the controller to the relay node.

22. The method of claim 16, wherein the scheduled transmission is from the relay node to the controller.

23. A communications controller comprising:
    a processor configured to execute programs and applications;
    a transmit and receive circuit coupled to the processor and to an antenna, the transmit and receive circuit configured to process received transmission and to prepare transmissions for transmission;
    a scheduler coupled to the processor, the scheduler configured to schedule backhaul resource blocks (RBs) using frequency division multiplexing and time division multiplexing to a plurality of relay nodes operating in a coverage area of the communications controller, to group relay nodes in the plurality of relay nodes into M sets, where M is a positive integer value, and to use performance information of the relay nodes in the plurality of relay nodes to schedule the RBs;
    a memory coupled to the processor, the memory configured to store applications, programs, and assignments of the RBs; and
    the antenna coupled to the transmit and receive circuit, the antenna configured to transmit a signaling message to each relay node in the plurality of relay nodes, the signaling message comprising, for each relay node, the assignments of the RBs for only the relay node, a frequency division parameter for only the relay node, a time division parameter for only the relay node, an indicator of an assignment of the relay node to a set from the M sets, and an indicator of an order of the relay node within the set.

24. The communications controller of claim 23, wherein the scheduler is further configured to use a spatial division multiplexing technique, a code division multiplexing technique, or a combination thereof, to allocate the RBs to the plurality of relay nodes.

* * * * *